United States Patent

Pool, III

[11] Patent Number: 5,816,638
[45] Date of Patent: Oct. 6, 1998

[54] PICKUP TRUCK BED EXTENDER, RAMP AND TAILGATE

[76] Inventor: William Bryan Pool, III, 2720 Primrose Dr., Pasadena, Tex. 77502

[21] Appl. No.: 837,248

[22] Filed: Apr. 10, 1997

[51] Int. Cl.⁶ .................................................. B62D 33/02
[52] U.S. Cl. ........................ 296/26.11; 296/57.1; 296/61; 296/62
[58] Field of Search ............................. 296/26, 57.1, 61, 296/62

[56]           References Cited

U.S. PATENT DOCUMENTS

| | | | |
|---|---|---|---|
| 2,181,342 | 11/1939 | Reid | 296/57.1 |
| 2,333,849 | 11/1943 | Driscoll | 296/62 |
| 3,352,440 | 11/1967 | Wilson | 296/61 |
| 4,136,905 | 1/1979 | Morgan | 296/57.1 |
| 4,420,182 | 12/1983 | Kaneshiro | 296/62 |
| 4,472,639 | 9/1984 | Bianchi | 296/26 |
| 4,531,773 | 7/1985 | Smith | 296/26 |
| 4,596,417 | 6/1986 | Bennett | 296/61 |
| 4,778,213 | 10/1988 | Palmer | 296/26 |
| 5,133,584 | 7/1992 | McCleary | 296/57.1 |
| 5,468,038 | 11/1995 | Sauri | 296/26 |

*Primary Examiner*—Gary C. Hoge
*Attorney, Agent, or Firm*—Michael B. Jolly

[57]           ABSTRACT

An attachment for elongating a pickup truck bed storage area which can also serve as a replacement tailgate for the truck's factory tailgate or a tailgate for the extended area and further a ramp, or stairway for loading the pickup truck. The device is easily attached to the pickup truck bed with the truck's existing tailgate lowered and encloses an area of the bed over the tailgate. The rear end of the device serves as a tailgate and a ramp or a stairway, which can be unlatched and unfolded extending for easy loading of the truck storage area.

3 Claims, 4 Drawing Sheets

PICKUP TRUCK BED EXTENDER, RAMP AND TAILGATE

RELATED APPLICATIONS

The present application is a continuation-in-part of a parent application which, at the time of executing and filing this application, has not received a serial number, and which parent application was executed on Feb. 20, 1997, and which is currently pending.

BACKGROUND OF THE INVENTION

Numerous devices have been developed which attach to or enhance a pickup truck bed storage area and pickup truck tailgate. Some pickup truck owners find it desirable to replace the factory tailgate with a custom gate which is either decorative or provides specific utility. Some owners equip their trucks with tool boxes, or other storage boxes within the pickup truck bed next to the truck's cab. A number of devices attach to the pickup truck bed for purposes of extending the truck's storage area or as aids in loading the storage area. While these devices solve particular problems associated with utilizing the truck's storage area, and tailgate they all lack an ability to provide an attachment which not only secures additional storage space, but also provides a ramp for easy loading of the truck cargo space, provides a tailgate for the extended portion of the storage area, optionally provides a tailgate which also functions as a step ladder for easy entry into the pickup truck bed, and provides an aerodynamic attachment which won't dam air in the pickup truck bed providing better gas milage for the truck.

Therefore there exist a need to provide a device which extends the standard pickup truck bed storage area, which is easily and quickly placed into a standard pickup truck bed with the truck's tailgate in the open position which can also function as a ramp or a step ladder, and tailgate for the extended portion or alternatively a tailgate replacement with a ramp system and which reduces the resistance to air flow through the pickup truck bed as the truck is operated.

The invention attaches to a pickup truck bed with the truck's tail gate open, and provides an extension of the pickup truck bed by enclosing the portion of the pickup truck bed opened by the tail gate. The device can also replace the truck's standard tailgate and provide an extended tailgate with attached ramps. When used as a storage space extender the device both encloses the extended portion of the pickup truck bed and serves as a tailgate, while also folding out as a ramp, or stairway if desired, for loading the pickup truck bed.

PRIOR ART

Hanley, U.S. Pat. No. 4,856,840 discloses a truck bed extender comprising a platform attachable to the rear of a truck, the platform being provided with a lip which is engaged between the rear end of the truck bed and the front end of a horizontal positioned open tailgate, a plurality of rods are inserted through the lip to engage the extender to the truck bed. Hanley, although useful for providing a removable platform for a pickup truck bed, does not provide a means for elongating the pickup truck bed storage area which can be utilized while the truck is in operation. Furthermore, the Hanley extender does not have a multiplicity of functions as the present invention which may be adapted to function as a ramp system, a stairway into the pickup truck bed, and a tailgate for the extended portion and further, alternatively, a replacement for the standard tailgate of the pickup truck bed as does the present invention.

Taylor, et al. U.S. Pat. No. 5,533,771 discloses a multipurpose truck tailgate apparatus comprising a first panel member slidingly attached in the bed of a truck which is extended when the tailgate is opened, a second panel member coupled to the first panel member and a third panel member coupled to the second panel member and a means for positioning the panels at various angles to be used for different task. Like Hanley, the Taylor device does not provide an storage space extending means and which can double as a ramp system, or a stairway, and tailgate for the truck bed as the present invention provides.

Wren, U.S. Pat. No. 4,020,957 discloses a detachable truck bed extension and loading ramp, comprising two triangular lower sections folded over and upon two triangular upper sections, forming a flat extended base when folded up and forming a ramp when unfolded. Although Wren provides a ramp system and a extender for a truck bed as the present invention, it does not provide an extender and ramp system or alternatively a stairway into the pickup truck bed, which also function as a tailgate for the extended portion of the truck bed nor does the Wren device enclose the extended portion of the truck bed as the present invention.

Tillery, U.S. Pat. No. 4,020,850 discloses a horizontal extension panel for disposition outwardly of the free end of a open truck tailgate with supporting members which function to brace the extension. Like Hanley the Tillery device is directed at elongating the truck bed beyond the open tailgate and additionally does not provide a ramp system, or alternatively a stairway into the pickup truck bed, and an enclosing system which also serves as a tailgate for the extended portion.

Smith, U.S. Pat. No. 4,531,773 discloses a foldable sliding container connected to a pair of slide guides secured to opposite sides of the truck's tailgate providing a storage area extension over the truck's open tailgate area. The Smith device does not function as a combination ramp, stairway, tailgate, and storage area extender as the present invention.

Bianchi, U.S. Pat. No. 4,472,639 discloses a retractable extender structure attachable to a pickup truck tailgate interior surface with a back panel and a pair of side panels with a hinged means for attaching the panels to the interior surface of the tailgate allowing the panels to be unfolded when the tailgate is open forming an extended cargo area and folded up remaining attached to the tailgate interior surface when the tailgate is closed. Although, Bianchi provides an extendable means for increasing the storage space above the open tailgate, the device does not also provide a tailgate for the extended portion which also doubles as a ramp system or a stairway into the truck's bed.

Bringman, U.S. Pat. No. 5,154,470 discloses an arrangement of support plates extending from an open tailgate arranged to provide additional cargo space both above and extending beyond the tailgate's end. The device provides additional cargo space as the present invention, however it does not double as a loading ramp or stairway and a tailgate for the extended portion of the truck's bed as the present invention.

Webber, U.S. Pat. No 5,456,511 discloses a truck bed cargo extender configured similar to a drawer which can be extended or retracted into to the truck's bed and further provides a tailgate positioned on the end of the drawer. Webber's device does not provide a ramp system or stairway which doubles as the extended tailgate.

SUMMARY OF THE INVENTION

It is accordingly an object of the present invention to provide an attachment for pickup trucks which attaches to the end of the pickup truck bed with the tailgate open which elongates a pickup truck bed storage area and also serves as a tailgate for the extended area and further a ramp, or alternatively a stairway, for loading the pickup truck or, alternatively, a replacement for the factory tailgate which provides an extended tailgate with attached ramps. Further to provide a device which is easily attached to the pickup truck bed which can be unlatched and unfolded extending to the ground for easy loading of the truck storage area. Further to provide a replacement tailgate for a pickup truck's factory tailgate which replacement tailgate functions either as a ramp system for easy entry into the truck's bed or alternatively a stairway for easy entry into the truck's bed.

DETAILED DESCRIPTION OF THE DRAWINGS

Figure 1:
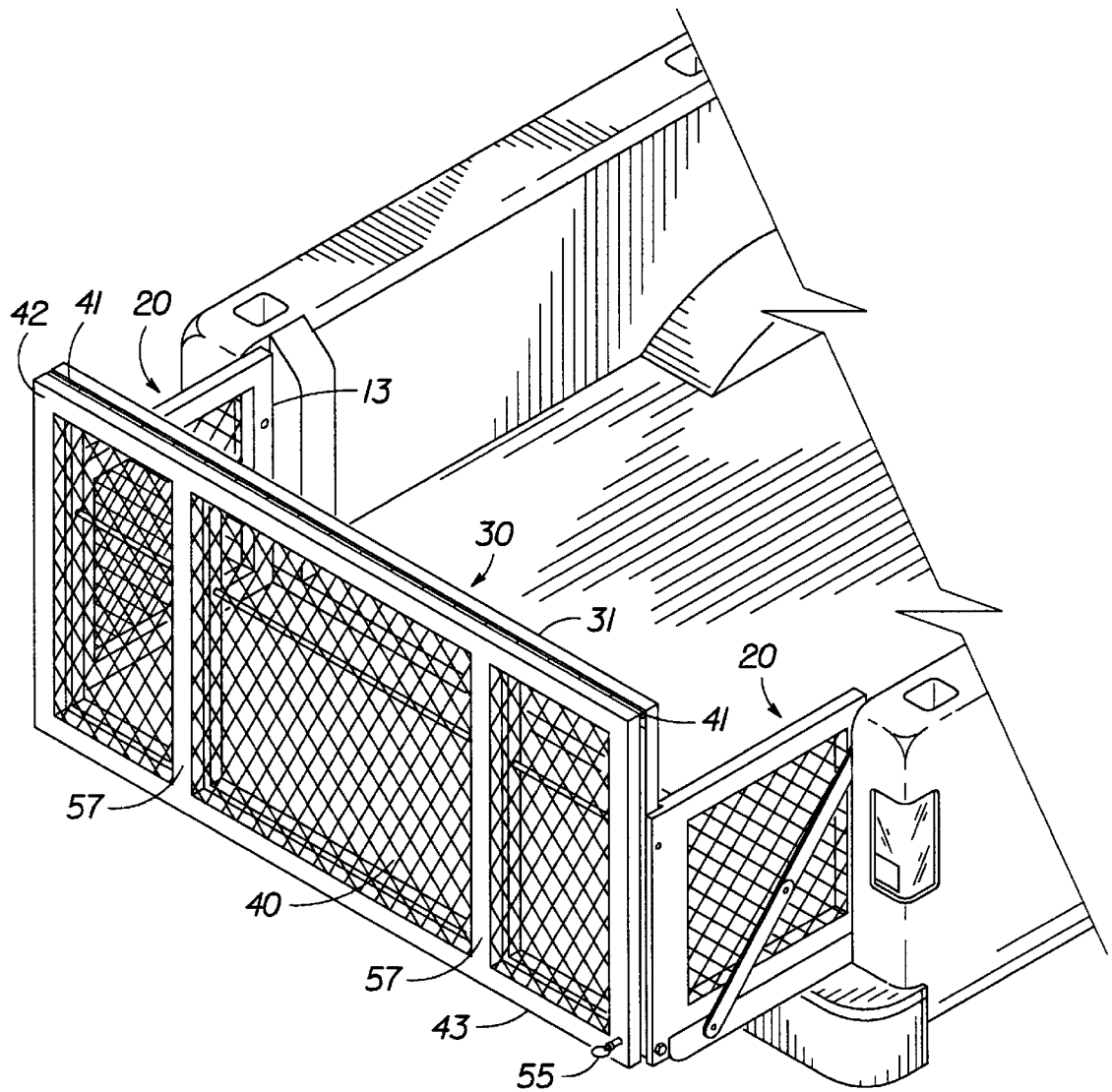
FIG. 1 is a perspective view of the device attached to a pickup truck with the device in the closed position.
Figure 2:
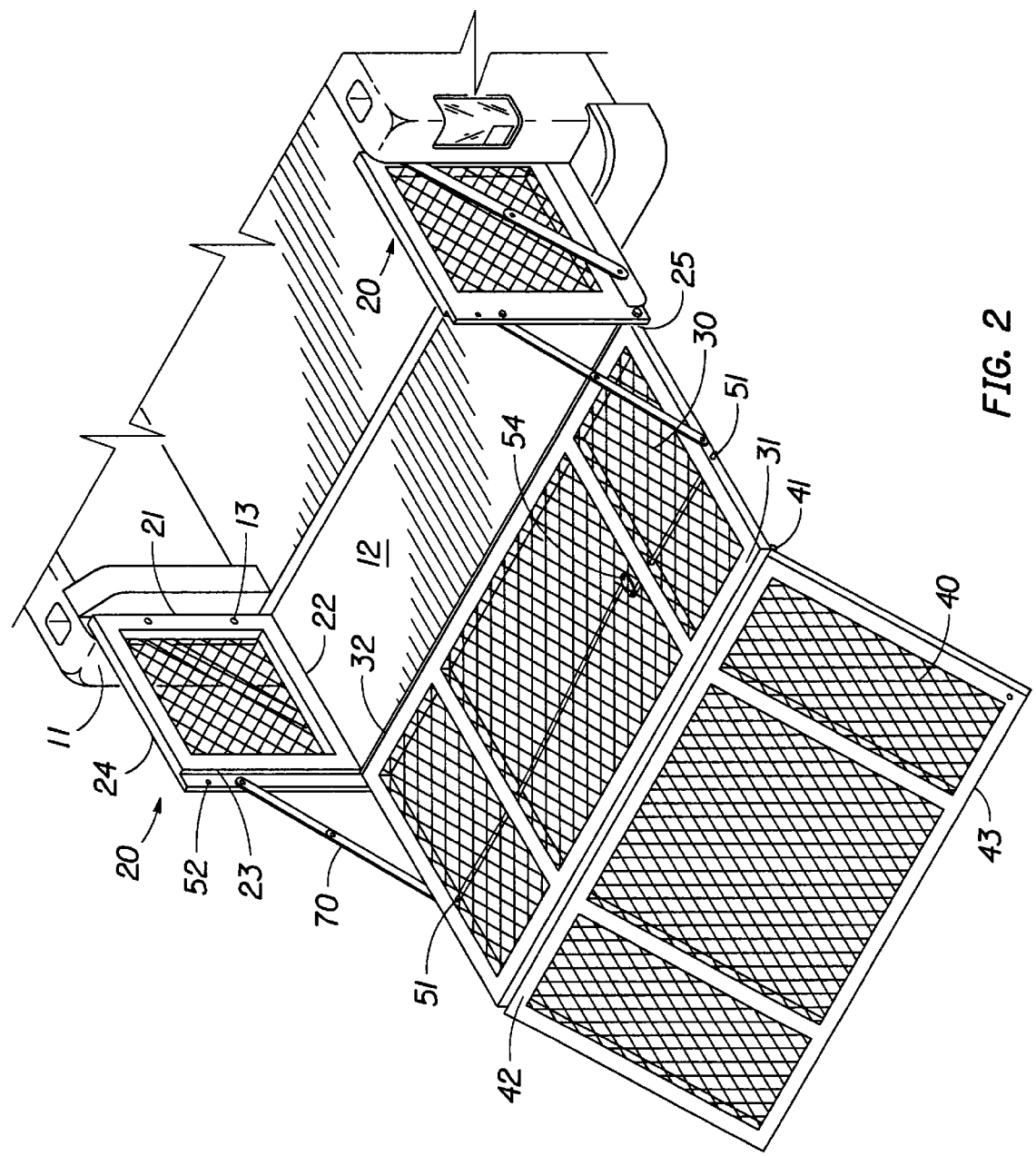
FIG. 2 is a perspective view of the device attached to a pickup truck with the device in the open position.
Figure 3:
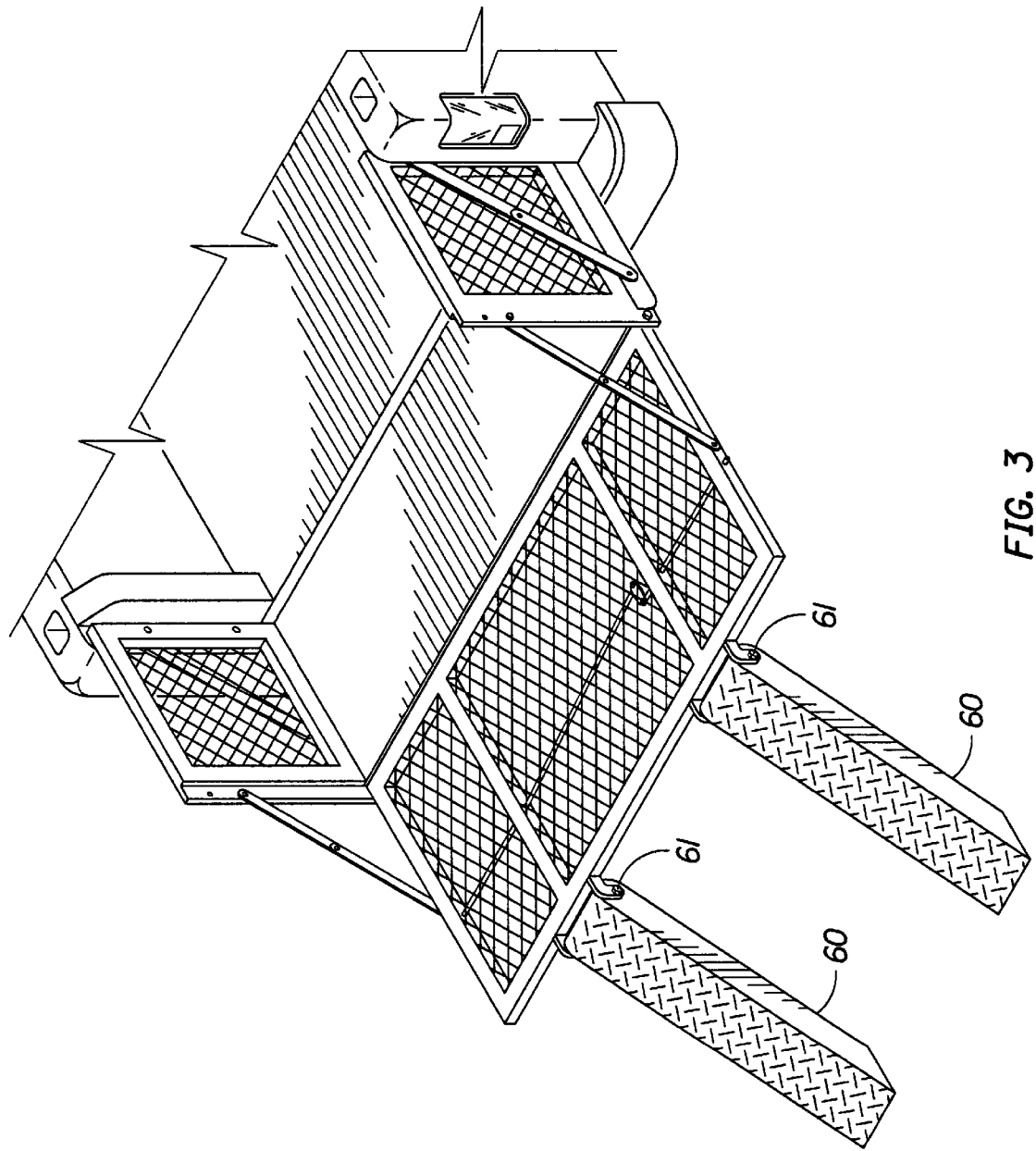
FIG. 3 is a perspective view of the device attached to a pickup truck with the device in the open position with individual ramps.
Figure 5:
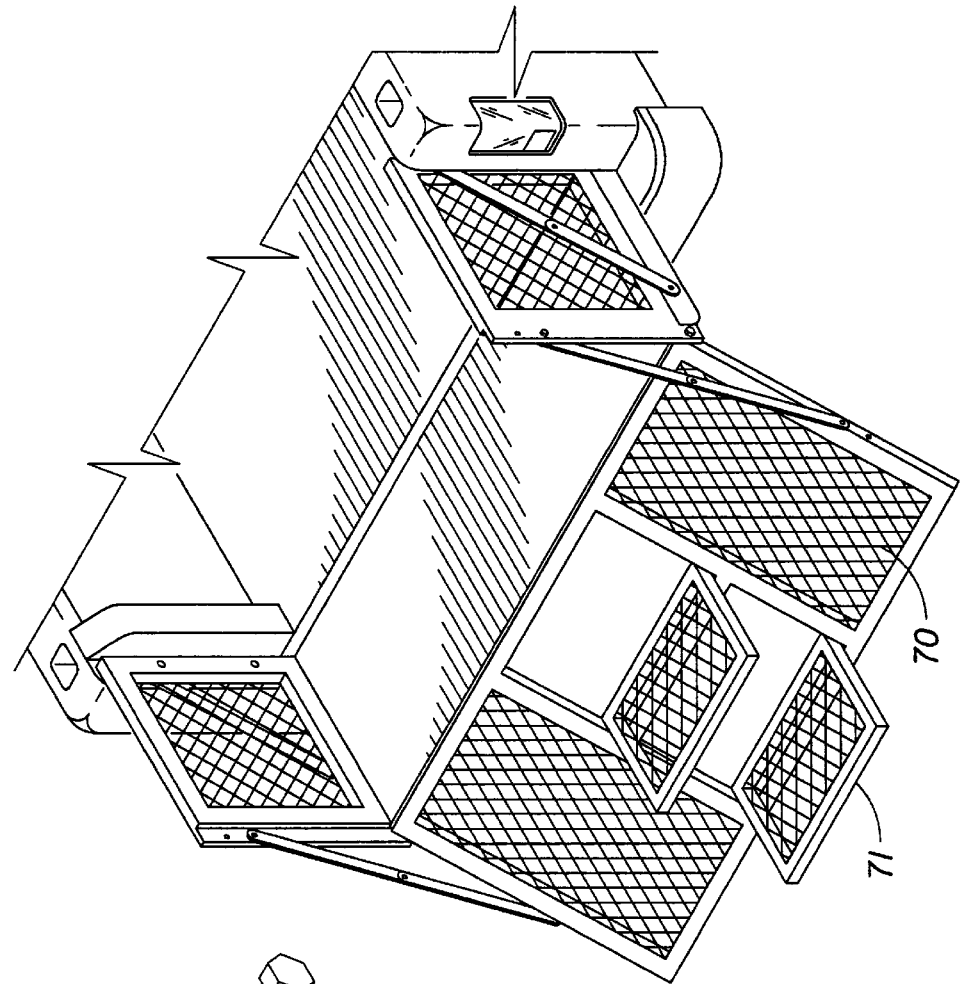
FIG. 5 is a perspective view of the device attached to a pickup truck with the device in the open position and further equipped with a pair of steps.
Figure 4:
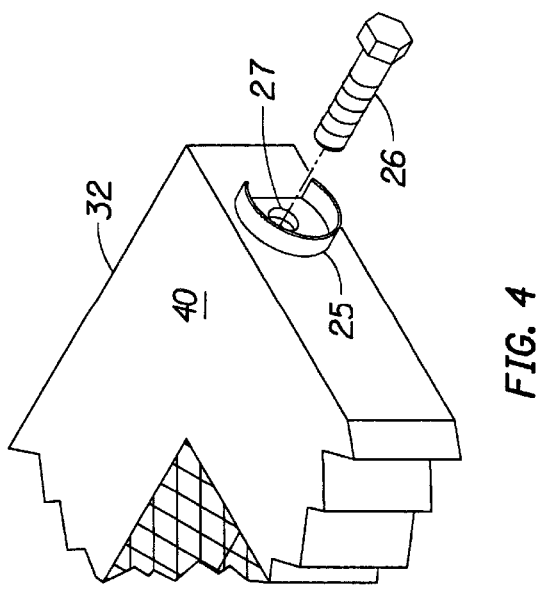
FIG. 4 is a close up view of the gate member pivotal attachment means.

Referring to the drawings the truck bed extension and ramp device is illustrated as installed upon the rear end of a pickup truck with the truck's tailgate open, in the horizontal position in FIGS. 2 and 3.

The device comprises side frame members 20, gate member 30, ramp gate 40, individual ramp members 60, latching means 50, and pivoting control means 70. The sidewalls 20 are mirror images of each other and are each constructed using preferable square tubular material of between 1 inch to about 2 inches wide. The sidewalls 20 are generally rectangular in shape having a securing edge 21 about seventeen to about nineteen inches long, a support edge 22 about twenty to about twenty two inches long, end edge 23 about one to about two inches longer than the securing edge 21, and a top edge 24 about the same length as the supporting edge. The securing edge 21 is used to secure the side member 20 to the interior of the pickup truck sidewall end 11. It is preferable to secure the securing edge 21 to the truck's interior sidewall 11 using bolts 13 extending through the side frame tubing into a section of the truck's sidewall suitable for receiving mounting bolts 13. The securing edge 21 is most preferable the same length as the truck sidewall is high resulting in the top edge being essentially even with the truck's sidewall height. The support edge 22 is equal to the height of the truck's tailgate interior surface 12, so that when the side frame members 20 are installed within the truck's tailgate open, the support edges 22 lay upon the horizontal tailgate interior surface 12 extending from the securing edge 21 to the top of the tailgate. The end edge 23 is a vertical piece like the securing member 21 and extends from the top edge 24 past the support edge 22 about one to about two inches. The portion of the end edge 23 which extends beyond the support edge 22 forms a pivotal mounting member 25 which extends below the horizontal surface of the tailgate 12 so that when the gate member 30 is attached and folded down to form a ramp there is minimal surface deviation from the tailgate horizontal surface 12 and the ramp surface. The mounting of the side frames 20 and the arrangement of the side frame edges results in the gate member 30 being received between the side frame members 20. The gate member 30 is rectangular in shape and the width dimensioned to replace a standard truck's tailgate and further between the mounted side frame end edges 23 and being about thirty to about forty inches high. The height of the gate member 30 will extend above the sidewalls 11 and the side members 20, this extension is necessary so that the gate member 30 and the ramp gate 40 combined will form a sufficiently long loading ramp, because a short ramp (caused by a short gate height) will be too steep for practical use for a loading ramp into the pickup truck's bed. The gate member 30 has a top edge 31 and a bottom edge 32, the bottom edge 32 being pivotally mounted to pivotal mounting members 25 with a pivot pin 26 received in the bottom edge threaded area 27. The pivotal mounting member 25 further functions as the standard pickup truck tailgate attachment so that the gate member 30 can either be attached to the sidewall frames 20 or to the pickup truck as a standard pickup truck tailgate if desired without the extending sidewalls 20. If the gate member 30 is attached to the extending sidewalls 20, then pivot pin 26 functions to further secure the gate member 30 and is inserted through the sidewalls 20 into the gate member 30 and threaded to secure the arrangement. The pivotal mounting of the gate member 30 allows the gate to be folded down to either allow entrance into the truck storage area or to be folded down to utilize the loading ramp. The gate member is secured in the closed position by a means which latches the gate member 30 between the side members 20. The latching means 50 is attached to the gate member 30 is most preferable a pair of rods 51 mounted to a rotating latching lever 54 which is biased to cause the rods to extend toward the side members 20 so that when the gate member 30 is brought into the closed position between the side members end edges 23, the biased latch engages a latch receiving area 52 on the end edges 23, or if the gate member is installed as a replacement of a standard pickup truck tailgate the latch should also coincide with the truck's tailgate latching means. The latch receiving area 52 for the sidewalls 20 is either an aperture or an attachment on the end edge 23 which provides an aperture for receiving the biased latching rods 51.

The ramp gate 40 can any size but is most preferable the same size and shape as the gate member and is secured to the gate member 30 by hinge 41. Alternatively, individual ramp members 60 may be attached to the gate member 30 by individual hinges 61. The hinge 41 for the ramp gate 40 is attached along the top edge 42 of the ramp gate 40 while the bottom edge is left free. The hinge 41 is positioned so that the ramp gate 40 and the gate member 30, when the gates are in the closed position, fold together flatly and further positioned so that when the gate member 30 is unlatched from its closed position and opened, the ramp gate can simultaneously be folded away from the gate member 30 until the ramp bottom edge 43 contacts the ground forming a ramp system. When fitted with individual ramp members 60, the gate member 30 and the ramp members 60 function similar to the ramp gate 40 and gate member 30. The individual ramp members 60 can individually be folded out while one ramp member is left secured, or both ramp members can be folded out providing a dual ramp system for loading four wheel vehicles.

It is preferable that the gate member 30 is fitted with a pivoting control means 70 which is attached to the gate member 30 and extends to the side member end edges 23 and further which function to limit how far the gate member may be opened similar to the conventional pickup truck tailgate extender arms. The control means 70 is most preferable detachable allowing the gate member to be lowered below 90° from the closed position. The control means 70 is also most preferable constructed of cable with loop connectors on each end.

The ramp gate 40 is further equipped with a clipping means 55 which clips the free end of the ramp gate 43 to the gate member 30, is the situation where individual ramp members are employed two clipping means 55 are used. So that if it is not desired to utilize the ramp, the gate member 30 may be opened as a conventional pickup truck tailgate as the ramp gate 40 remains clipped to the opening gate member 30. Also the clipping means 55 prevents the bottom end of the ramp member from swinging freely as the truck is in operation. The clipping means may be a rod which extends through aligned apertures in both the gate member 30 and ramp gate 40.

The gate member 30 may also be equipped with a pair of pivoting steps 70, which are constructed of tubular material similar to the gate member. The steps 70 are mounted so that as the gate is opened they pivot to a position which facilitates their use as steps into the pickup truck bed. Furthermore, the step pivot points 71 are positioned so that the steps will not pivot when pressure is applied by someone stepping on the step. The step pivot point 71 further is positioned so that as the gate member 30 is placed into the closed position, the steps freely pivot to a position that is substantially parallel with the gate member 30, and further when the gate member 30 is placed in the open the steps pivot freely to a step position.

The material used to construct the gate member 30, ramp gate 40, and the side members 20 is most preferable one inch to about two inch square metal tubing, the interior of the members is covered with a metal screen or grating material so that air may freely flow through the members, preventing air from damming in the pickup truck bed while in operation. The inventor has also found that it is desirable to include two pairs of addition support members 57 positioned both on the gate member 30 and the ramp gate 40 so that when the ramp system is folded out the support members 57 form two supported paths up the ramp gate and the gate member, and further positioning the pairs of support members to coincide with the track width of most lawn tractors, 4 WD recreation vehicles, or all terrain vehicles, so that the ramp may be utilized for loading these vehicles. The support members 57 are most preferable about thirty inches apart, which will accommodate most vehicle loading.

The individual ramp members 60 are most preferable constructed of material such as aluminum or galvanized steel with underside support ribs and a slip resistant surface, additionally, the ramps 60 should be about five or eight inches wide and about thirty to about thirty six inches long.

I claim:

1. A device for extending the storage space of a conventional pickup truck bed wherein the truck bed is open and substantially horizontal, extends from the truck cab to a tailgate, has two sidewalls extending the length of the bed from the truck cab to the tailgate, and further has an interior cargo space defined by the truck bed surface, rear truck cab surface, and interior surfaces of the sidewalls and tailgate, the device is installed with the pickup truck's tailgate open in a substantially horizontal position with the tailgate interior surface essentially parallel to the truck bed surface and enlarges the pickup truck cargo space to include the area over the truck's horizontally positioned tailgate while also functioning as a tailgate for the storage space area, the device comprising;

a) two side frame members, each side frame member dimensioned generally as a rectangle, a securing edge of each side frame member releasably secured to each truck bed sidewall interior surface, a support edge of each side frame member laying upon the open truck tailgate interior surface, an end edge of each side frame member extending perpendicular from the open horizontal tailgate, and a top edge of each side frame member being even with a top edge of the pickup truck side walls, b) a gate member dimensioned generally as a rectangle having two short mounting edges, a top edge, and a bottom edge, the gate member being positioned with the two short mounting edges between the end edges of each side member with the gate member top edge extending above the side member top edges, the gate member further being hingedly secured to the side frame members by a pivotal mounting means secured to the gate's bottom edge and to a corner of each side frame member formed between the side frame end and support edges, c) a latching means attached to the gate member allowing the gate to be latched in a closed position when the gate is pivoted upwardly between the side frame member end edges and further said latching means providing a means to release the gate from the latched closed position allowing the gate to hinge downwardly pivoting along the gate bottom pivotal mounting means, d) a pivoting control means which functions to prevent the gate from pivoting beyond 90° from the closed position further providing a means for selectively engaging the pivoting control means which allows the gate to pivot beyond 90° if desired, and e) wherein the gate member pivotal mounting means allows the gate member to be pivotally mounted to a pickup truck's factory tailgate mounting members while also allowing the gate member, if desired to be pivotally mounted between the side frame members.

2. A device for extending the storage space of a conventional pickup truck bed wherein the truck bed is open and substantially horizontal, extends from the truck cab to a tailgate, has two sidewalls extending the length of the bed from the truck cab to the tailgate, and further has an interior cargo space defined by a truck bed surface, rear truck cab surface, and interior surfaces of the sidewalls and tailgate, the device is installed with the pickup truck's tailgate open in a substantially horizontal position with the tailgate interior surface essentially parallel to the truck bed surface and enlarges the pickup truck cargo space to include the area over the truck's horizontally positioned tailgate while also functioning as a tailgate for the storage space area, the device comprising;

a) two side frame members, each side frame member dimensioned generally as a rectangle, a securing edge of each side frame member releasably secured to each truck bed sidewall interior surface, a support edge of each side frame member laying upon the open truck tailgate interior surface, an end edge of each side frame member extending perpendicular from the open horizontal tailgate, and a top edge of each side frame member being even with a top edge of the pickup truck side walls, b) a gate member dimensioned generally as a rectangle having two short mounting edges, a top edge, and a bottom edge, the gate member being positioned with the two short mounting edges between the end edges of each side member with the gate member top edge extending above the side member top edges, the gate member further being hingedly secured to the side frame members by a pivotal mounting means secured to the gate's bottom edge and to a corner of each side frame member formed between the side frame end and support edges, c) a latching means attached to the gate member allowing the gate to be latched in a closed position when the gate is pivoted upwardly between the side frame member end edges and further said latching means providing a means to release the gate from the latched closed position allowing the gate to hinge downwardly pivoting along the gate bottom pivotal mounting means, d) a pivoting control means which functions to prevent the gate from pivoting beyond 90° from the closed position, further providing a means for selectively engaging the pivoting control means which allows the gate to pivot beyond 90° if desired, e) a pair a step members each dimensioned generally as a rectangle formed from tubular perimeter frame material, the steps forming two pads which support a person desiring to enter the pickup truck's bed, the steps are further spaced apart from each other a desired distance to provide easy stepping distance between the steps, additionally the steps are positioned upon the gate member so that when the gate member is in the open position the steps are positioned parallel with the gate member and when the gate member is in the open position, the step members pivot to a horizontal position.

3. Apparatus as set forth in claim 2 wherein said steps are pivotally mounted on the gate member so that when the gate member is in the closed position, the step members pivot.

* * * * *